US008861737B2

(12) United States Patent
Thomas et al.

(10) Patent No.: US 8,861,737 B2
(45) Date of Patent: Oct. 14, 2014

(54) TRUST ESTABLISHMENT FROM FORWARD LINK ONLY TO NON-FORWARD LINK ONLY DEVICES

(75) Inventors: Panagiotis Thomas, Carlsbad, CA (US); Can E. Acar, San Diego, CA (US); Philip Michael Hawkes, Warrimoo (AU); Bijan Ansari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1120 days.

(21) Appl. No.: 12/788,849

(22) Filed: May 27, 2010

(65) Prior Publication Data

US 2010/0306538 A1     Dec. 2, 2010

Related U.S. Application Data

(60) Provisional application No. 61/182,050, filed on May 28, 2009.

(51) Int. Cl.
    *H04L 9/32*            (2006.01)
    *H04L 9/08*            (2006.01)
    *H04L 29/06*          (2006.01)

(52) U.S. Cl.
    CPC ............ *H04L 9/0844* (2013.01); *H04L 9/0822* (2013.01); *H04L 9/0891* (2013.01); *H04L 9/3242* (2013.01); *H04L 63/0435* (2013.01); *H04L 63/0464* (2013.01); *H04L 63/068* (2013.01); *H04L 2209/601* (2013.01); *H04L 2209/80* (2013.01)
    USPC .......................................... 380/284; 713/171

(58) Field of Classification Search
    None
    See application file for complete search history.

(56) References Cited

U.S. PATENT DOCUMENTS

| 2003/0133576 | A1* | 7/2003 | Grumiaux | 380/279 |
| 2006/0033840 | A1* | 2/2006 | Diehl et al. | 348/468 |
| 2006/0115081 | A1 | 6/2006 | Buer et al. | |
| 2007/0116051 | A1 | 5/2007 | Chen | |
| 2008/0227428 | A1 | 9/2008 | Rezaiifar et al. | |
| 2008/0267407 | A1* | 10/2008 | Vanderveen | 380/277 |

(Continued)

FOREIGN PATENT DOCUMENTS

| JP | 2007082191 A | 3/2007 |
| JP | 2011524676 A | 9/2011 |

(Continued)

OTHER PUBLICATIONS

Arkko E Carrara F Lindholm M Naslund K Norrman Ericsson Research J: "MIKEY: Multimedia Internet KEYing; rfc3830.txt", IETF Standard, Internet Engineering Task Force, IETF, CH, Aug. 1, 2004, XP015009608, ISSN: 0000-0003.

Baugher D McGrew Systems et al, RFC 3711, "The Secure Real_Time Transport Protocal (SRTP)" IETF Standard, Internet Engineering Task Force, IETF, CH, Mar. 2004, XP015009491.

(Continued)

*Primary Examiner* — Michael R Vaughan
(74) *Attorney, Agent, or Firm* — Won Tae Kim

(57) ABSTRACT

A method, apparatus, and/or system are provided for establishing trust between an accessory device and a host device, using a global key known to both the host device and the accessory device, so that content protection for subscriber-based mobile broadcast services is provided. A secure link may be established between the accessory device and the host device so that when the accessory device receives encrypted content via a secured forward link only network, the accessory device may decrypt the content at the forward link only stack. The content is then re-encrypted/re-secured using one or more derived encryption keys and then sent to the host device where it may be decrypted and played back. A global key, unique to the particular device type of the host device, is employed to ultimately derive the session encryption keys used to re-encrypt/re-secure the content conveyed from the accessory device to the host device.

46 Claims, 12 Drawing Sheets

(56) References Cited

U.S. PATENT DOCUMENTS

2008/0307507 A1    12/2008    Conley et al.
2009/0319792 A1*  12/2009    Hawkes et al. ............... 713/170
2010/0235624 A1*   9/2010    Candelore .................... 713/155

FOREIGN PATENT DOCUMENTS

TW        200822653 A     5/2008
WO      2007117308 A2   10/2007
WO      2008097894 A1    8/2008

OTHER PUBLICATIONS

Chapter 12: Key Establishment Protocols ED—Menezes A J; Van Oorschot P C; Vanstone S A, [Online] Oct. 1, 1996, Handbook of Applied Cryptography; [CRC Press Series on Discrete Mathematices and Its Applications], CRC Press, Boca Raton, FL, US, pp. 489-541, XP001525012, ISBN: 978-0-8493-8523-0 Retrieved from the Internet: URL:http://www.cacr.math.uwaterloo.ca/hac/.

Dondeti Qualcomm L, et al., "MIKEYv2: SRTP Key Management using MIKEY, revisited; draft-dondeti-msec-rtpsec-mikeyv2-01. txt", IETF Standard-Working-Draft, Internet Engineering Task Force, IETF, CH, No. 1, Mar. 5, 2007, XP015048920, ISSN: 0000-00.

International Search Report and Written Opinion—PCT/US2010/036655, International Search Authority—European Patent Office—Jan. 27, 2011.

Taiwan Search Report—TW099117258—TIPO—Mar. 8, 2013.

* cited by examiner

TRUST ESTABLISHMENT FROM FORWARD LINK ONLY TO NON-FORWARD LINK ONLY DEVICES

CLAIM OF PRIORITY UNDER 35 U.S.C. §119

The present application for patent claims priority to U.S. Provisional Application No. 61/182,050 entitled "UMR Key Establishment", filed May 28, 2009, assigned to the assignee hereof and hereby expressly incorporated by reference herein.

BACKGROUND

1. Field

One feature relates to providing content protection for subscriber-based mobile broadcast services. More specifically, trust is established between an accessory device and host device using a global key determined according to the type of host device.

2. Background

Wireless networking systems have become a prevalent means to communicate with others worldwide. Wireless communication devices, such as cellular telephones, personal digital assistants, and the like have become smaller and more powerful in order to meet consumer needs and to improve portability and convenience. Consumers have become dependent upon these devices, demanding reliable service, expanded areas of coverage, additional services (e.g., web browsing capabilities), and continued reduction in size and cost of such devices.

A typical wireless communication network (e.g., employing frequency, time, and/or code division techniques or a combination thereof) includes one or more base stations that provide coverage areas to subscribers as well as mobile (e.g., wireless) devices that can transmit and/or receive data within the coverage areas. A typical base station can simultaneously transmit multiple data streams to multiple devices for broadcast, multicast, and/or unicast services, wherein a data stream is a stream of data that can be of independent reception interest to a user device. A user device within the coverage area of that base station can be interested in receiving one, more than one or all the data streams carried by the composite stream. Likewise, a user device can transmit data to the base station and/or another user device.

Forward link only technology has been developed by an industry group of wireless communication service providers to utilize the latest advances in system design to achieve the highest-quality performance. Forward link only technology is intended for a mobile multimedia environment and is suited for use with mobile user devices. Forward link only technology is designed to achieve high quality reception, both for real-time (streaming) content and other data services. Forward link only technology can provide robust mobile performance and high capacity without compromising power consumption. In addition, the technology reduces the network cost of delivering multimedia content by decreasing the number of base station transmitters that are necessarily deployed. Furthermore, forward link only technology based multimedia multicasting is complimentary to wireless operators' cellular network data and voice services, as cellular network data can be delivered to a same device that receives multimedia content by way of forward link only technology.

One such forward link only technology is MediaFLO™, by Qualcomm Inc., which broadcasts data to portable access terminals such as cell phones and personal digital assistants (PDA). MediaFLO™ is a subscriber-based service and requires the device receiving the service to have an embedded forward link only receiver. However, service may now be extended to devices that do not have an embedded forward link only receiver. To utilize the service, a user may purchase a forward link only receiver, hereafter referred to as an "Accessory Device" that can stream content to a non-forward link only device, hereafter referred to as a "Host Device".

Content providers as well as MediaFLO™ service operators mandate that such service deployment is robust against the following attacks: (1) extract unencrypted digital content from the accessory device, the host device, or the communication link between the two; (2) stream MediaFLO™ content to host devices that are not in the specified list of 'approved host types'; (3) stream MediaFLO™ content to more than one host device at a time; and (4) stream MediaFLO™ content to a host device without the consent of the device owner while it is in his/her position.

However, in MediaFLO™ systems, content is encrypted only up to the forward link only protocol stack (e.g., the accessory device). As a result, the transmission of the content from the forward link only protocol stack (e.g., the accessory device) to the host device is not secure. Therefore, a method is needed for establishing trust between the accessory device and host device.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one feature, a method operational on a host device is provided for establishing trust with an accessory device. When establishing trust with the accessory device, the host device may sending a pairing request message to the accessory device, the pair request message including an identification of a device type of the host device. An encrypted key generator value and a random number may be received from the accessory device. The key generator value may be encrypted using an encryption key derived from the random number and a global key, which global key is known to the host device and is the same value for all devices of a same device type. The encryption key may be derived from the global key and the random number, and may be used to decrypt the key generator value. Using the key generator value and the random number, a device key may be derived that may be used for establishing secure delivery of content from the accessory device.

According to one feature, a host device may establish trust with an accessory device. The host device may include a storage medium and a communication interface that is adapted to communicate with the accessory device. A processing circuit may be coupled to the communication interface and the storage medium. The processing circuit may send a pairing request message including an identification of a device type of the host device to an accessory device, and may receive an encrypted key generator value and a random number from the accessory device in response. The key generator value may be encrypted using an encryption key derived from the random number and a global key, which global key is known to the host device and is the same value for all devices of a same device type. The processing circuit may use the global key and the received random number to derive the encryption key used for decrypting the key generator value. Using the key generator value and the random number, the processing circuit may derive a device key for use establishing secure delivery of content from the accessory device.

According to one feature, a method operational on an accessory device is provided for establishing trust with a host device. The accessory device may be a forward link only receiver that may be physically coupled to the host device. The accessory device may receive a pairing request message from a host device including an indication of a device type of the host device. Having the device type of the host device, the accessory device may look up a global key associated with the device type. Such a global key comprises a value that is the same for all devices of a same device type. A random number and a key generator value may be generated. Using the random number and the global key, an encryption key may be derived. The key generator value, encrypted using the encryption key, together with the random number may be sent to the host device. A device key may be derived using the key generator value and the random number, which device key may be employed for establishing secure delivery of content to the host device.

According to one feature, an accessory device may establish trust with a host device. The accessory device may be a forward link only receiver that may be physically coupled to the host device. The accessory device may include a first communication interface for receiving communications with a subscriber-based service and a second communication interface for communicating with a host device. A processing circuit may be coupled to the first and second communication interfaces. In establishing trust with the host device, the processing circuit may receive an indication from the host device identifying a device type of the host device. After receiving the device type of the host device, the processing circuit may look up a global key associated with the device type of the host device. The global key comprises a value that is the same for all devices of a same device type. The processing circuit may generate a random number and a key generator value, and may derive an encryption key from the global key and the random number. Using the encryption key, the processing circuit may encrypt key generator value, and may send the encrypted key generator value and the random number to the host device. Furthermore, the processing circuit may derive a device key from the key generator value and the random number, which the device key may be employed for establishing secure delivery of content to the host device.

DETAILED DESCRIPTION

Figure 1:
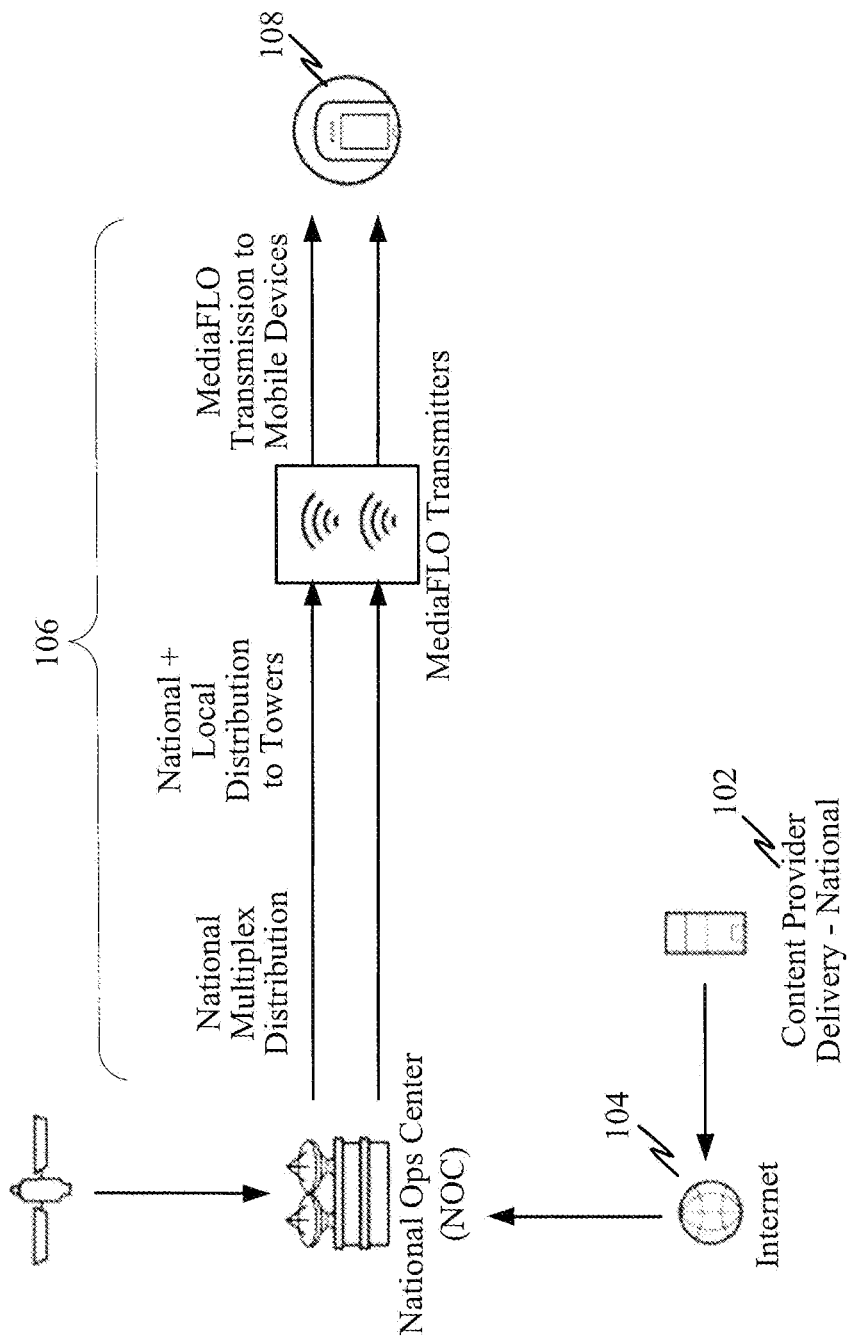
FIG. 1 is a block diagram illustrating an example of forward link only technology deployment.

In the following description, specific details are given to provide a thorough understanding of various embodiments. However, it will be understood by one of ordinary skill in the art that the embodiments described may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

In the following description, certain terminology is used to describe certain features. The term "accessory device", includes, but is not limited to, a forward link only receiver. The term "host device", includes, but it not limited, to a non-forward link only device.

Identified below are a list of acronyms and definitions used through this application.

ACRONYMS & DEFINITIONS

X<<N Bitwise left-shift of X by N bits
X>>N Bitwise right-shift of X by N bits
E{key} {value} Encrypted value using key.
X||Y Concatenation of X and Y
X⊕y Bitwise XOR operation of X and Y
HMAC{key} {value} Keyed-hash message authentication code of value using key
Overview A security system may be applied to content transmissions over a broadcast/multicast network infrastructure. The broadcast network infrastructure may be Evolution-Data Only Broadcast Multicast Services (BCMCS) that facilitates distribution of a subscription-based content delivery service. Upon subscribing to the content delivery service, the subscriber host device may be coupled to an accessory device adapted to receive the subscription-based content. Both the host device and the accessory device have a global key unique to a type (e.g., a make and/or model) of the host device. This global key is employed by the host device and the accessory device to generate one or more shared keys to secure a communication link between the host device and accessory device.

More particularly, the accessory device generates a random value (or number) and a key generator value. Using the random value and the global key known to both the accessory device and the host device, the accessory device may derive an encryption key, a salt value and an authentication key. The accessory device employs the derived keys to encrypt the key generator value and send the encrypted key generator value, together with the random value to the host device. The accessory device employs the authentication key to provide authenticator material to the host device. The accessory device further employs the key generator value and the random value to derive a device key.

The host device may use the random value received from the accessory device and the global key to derive the same encryption key, salt value and authentication key. The host device uses the authentication key and the received authenticator material to authenticate the received information. Using the keys, the host device may decrypt the key generator value. The host device employs the key generator value together with the random value to derive the same device key derived by the accessory device. With the device key shared by the accessory device and the host device, the device key may be used to establish a secured communication session with the accessory device and encrypt content communicated from the accessory device to the host device.

Network Environment

One example of a subscriber-based forward link only service is MediaFLO™, by Qualcomm Inc., which broadcasts data to an accessory device coupled to a portable host device (e.g., access terminals) such as cell phones and PDAs. Broadcast data may include multiple real-time audio and/or video streams, individual, non-realtime video and/or audio "clips", as well as internet protocol (IP) datacast application data such as stock market quotes, sports scores, and weather reports. The "F-L-O" in MediaFLO™ stands for forward link only, meaning that the data transmission path is one-way, from the tower/server to the host device or accessory device. MediaFLO™ addresses the inherent spectral inefficiency of unicasting high-rate full-motion video/audio to multiple subscribers but instead broadcasting such content. To limit access to the broadcasted content to subscribers, the content may be secured or encrypted by a key known only to subscriber accessory devices. MediaFLO™ content delivery may be implemented, for example, over an Evolution-Data Optimized or Evolution-Data only (EVDO) network that authenticates subscriber accessory devices and distributes the keys used to decode the programming.

FIG. 1 is a block diagram illustrating an example of forward link only technology deployment. Real-time content may be received directly from content providers 102, while non-real-time content can also be received over the Internet 104. The content may be reformatted into forward link only packet streams and distributed over a distribution network. In the target market, the content may be received and forward link only packets may be converted to a forward link only waveform 106 and radiated to accessory devices coupled to host devices 108.

As noted above, the host device 108 may be communicatively coupled to forward link only receiver, referred to herein as an "accessory device" (not shown) that can stream content to the non-forward link only host device 108. According to at least one feature, trust may be established between the host device 108 and the accessory device for protecting the communication link between the accessory device and the host device 108.

Exemplary Key Management

Figure 2:
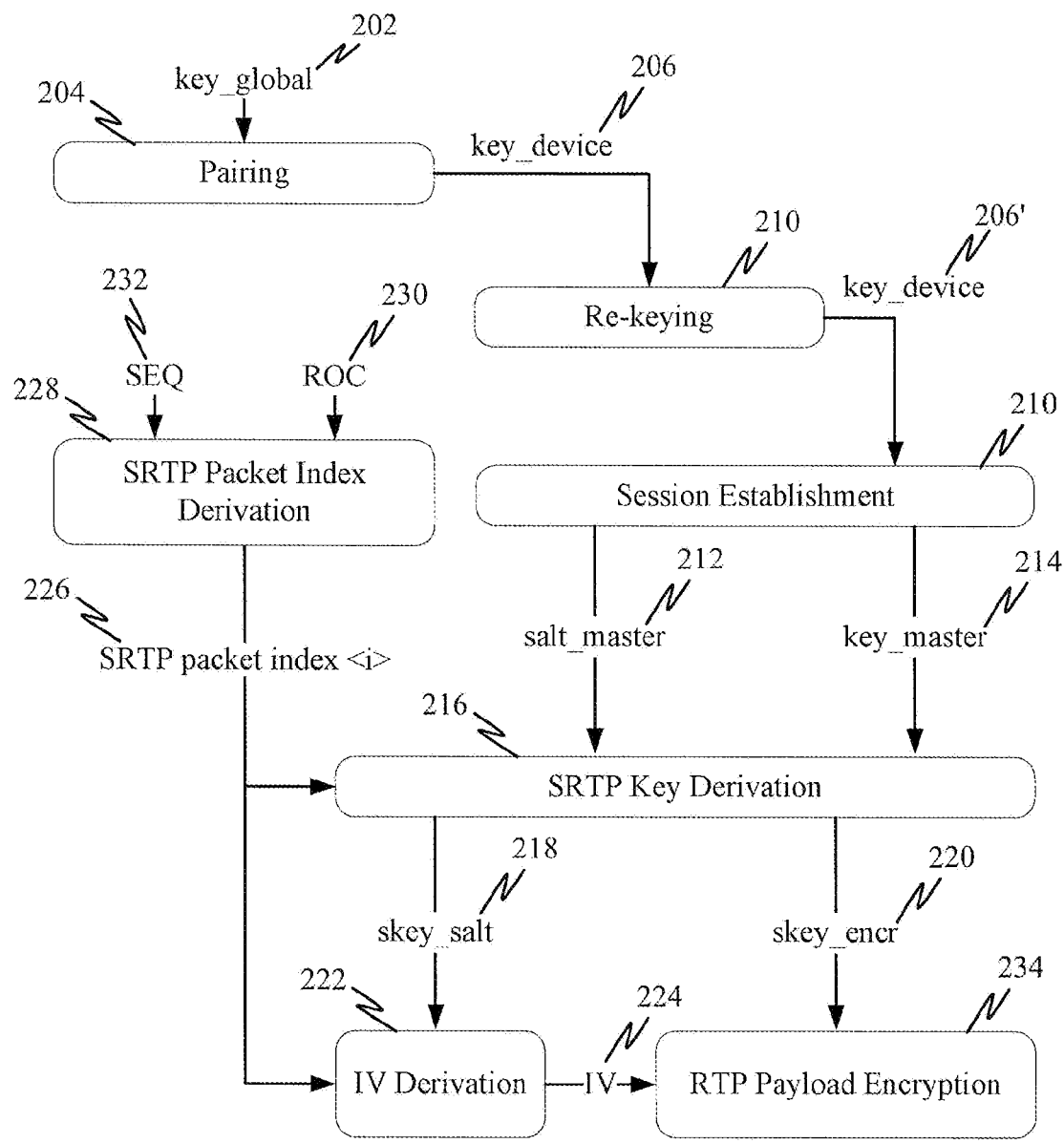
FIG. 2 is a flow diagram illustrating an example of key management for establishing trust between a host device and an accessory device.

FIG. 2 is a flow diagram illustrating an example of key management for establishing trust between a host device and an accessory device. As shown, the root of trust for all key management operations is a global key identified as key_global 202 in FIG. 2. The global key 202 comprises a key value that is shared among all accessory devices and among all host devices of a particular type. That is, each host device for a given type (e.g., iPhone®, Blackberry®, Windows Mobile®) may have the same assigned global key, which global key is known to both the host device and the accessory device prior to the two devices being paired together. The global key 202 may be provided to a host device, for example, when a host device downloads a software application associated with the forward link only content, and the accessory device may include a list identifying the global keys for all different types of host devices. By way of example and not limitation, the global key 202 may comprise a 256-bit symmetric key. The global key is employed in a pairing operation 204 to generate a device key (or key_device) 206. The device key 206 is a secret key shared between a host device and an accessory device. The device key 206 may be replaced according to some schedule (e.g., every day, week, month). In such implementations, the old device key 206 may be employed by a re-keying operation 208 to derive a new device key identified as 206' in FIG. 2. The device key 206, 206' may be employed by a session establishment operation 210 to generate a master salt value (or salt_master) 212 and a master key (or key_master) 214 for use in secured real-time transport protocol (SRTP) sessions.

An SRTP session may employ the salt_master 212 and the key_master 214 in a SRTP key derivation operation 216 for deriving a session salt value (or skey_salt) 218 and a session encryption key (or skey_encr) 220 using a known key derivation algorithm. For example, the session salt value 218 and the session encryption key 220 may be derived using the algorithm specified in section 4.3.1 of the Secure Real-Time Transport Protocol (SRTP) published by the Network Working Group, which protocol is generally known and available to a person of ordinary skill in the art, and is expressly incorporated herein by this reference. In general, using the SRTP algorithm, the host device and the accessory device may derive a 112-bit session salt value 218 from the value resulting from the encryption of some value X by the master key 214, where X is the value resulting when the master salt value 212 is combined by a logic XOR operation with the concatenation of 0x02 and a value i that has been bitwise shifted to the right by 24 bits (i.e., skey_salt=E{key_master}{X}, where X=salt_master $\oplus$ (0x02||(i>>24))). Similarly, the host device and the accessory device may derive a 128-bit session encryption key 220 from the encryption of some value Y by the master key 214, where Y is the value resulting when the master salt value 212 is combined by a logic XOR operation with the concatenation of 0x00 with i bitwise right shifted by 24 bits (i.e., skey_encr=E{key_master} {Y}, where Y=salt_master (0x00||(i>>24))).

The session salt value 218 is used by an initialization value derivation operation 222 to derive an initialization value (or IV) 224. The initialization value 224 may be derived according to the formula IV=(skey_salt<<16)⊕(0x0000000011 ((SSRC||i)<<16)), where SSRC is a 32-bit synchronization source identifier value within the real-time transport protocol (RTP) packet header.

The value 'i' used in the SRTP key derivation operation 216 and the initialization value derivation operation 222 is a 48-bit SRTP packet index 226 whose value is derived by a SRTP packet index derivation operation 228 as defined by the secure real-time transport protocol, referred to above and incorporated by reference. In particular, the SRTP packet index 226 may be derived by adding a rollover counter (or ROC) 230 to a sequence number (or SEQ) 232, and multiplying the sum by 2^16 (i.e., i=(2^16)*(ROC+SEQ).

After deriving the initialization value 224 and the session encryption key 220, a real-time transport protocol (RTP) payload encryption operation 234 may be performed to encrypt the content (or payload) to be transmitted from the accessory device to the host device. In conventional real-time transport protocol (RTP), video and audio packets are delivered in separate RTP streams. Using the initialization value 224 and the session encryption key 220, packets for each stream may be encrypted according to the secure real-time transport protocol (SRTP) referred to above and incorporated by reference herein.

Exemplary Pairing Operation Between a Host Device and an Accessory Device

Figure 3A:
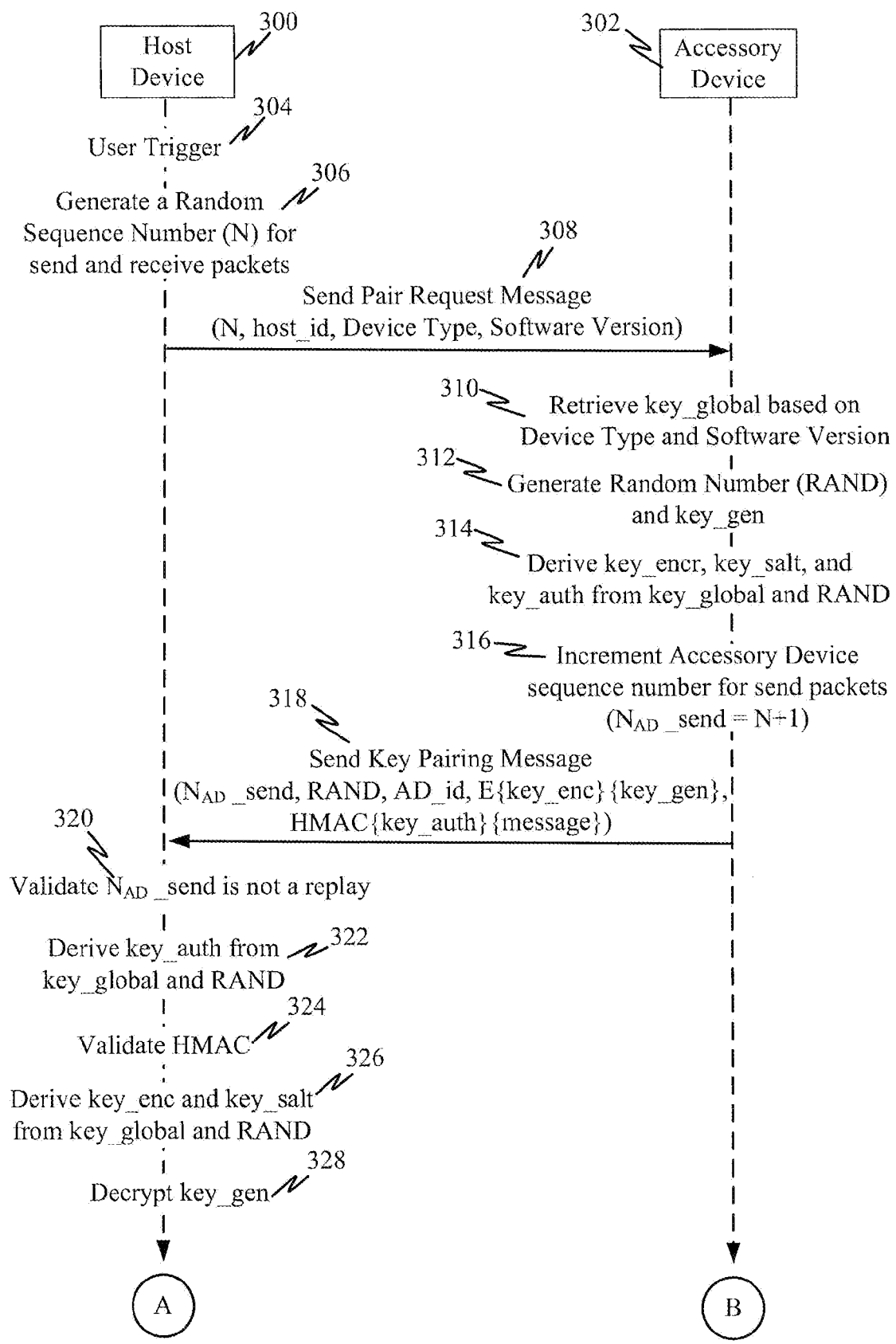
FIG. 3 (comprising FIGS. 3A and 3B) is a flow diagram illustrating one example of a pairing operation between an accessory device and a host device.
Figure 3B:
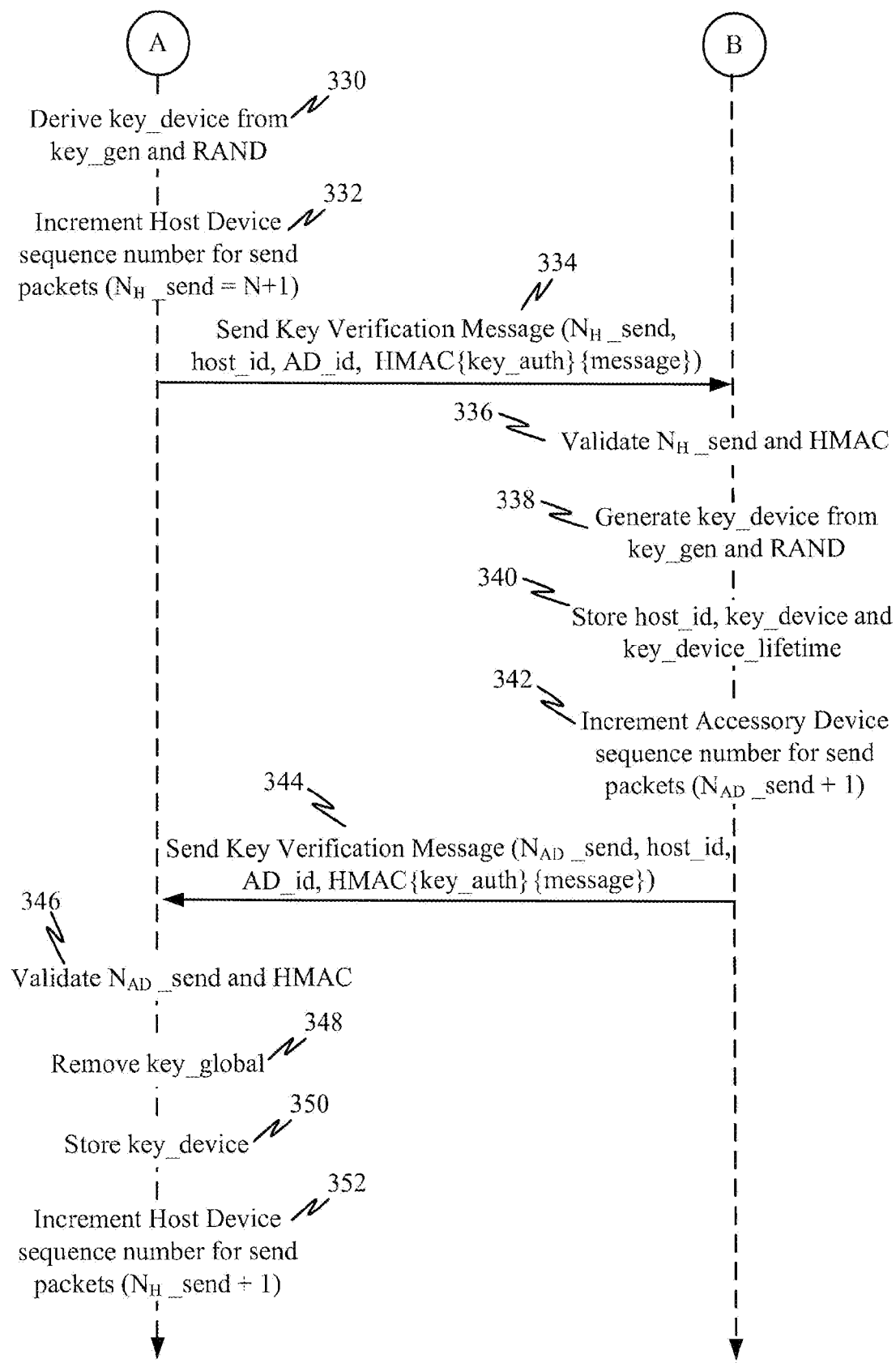

FIG. 3 (comprising FIGS. 3A and 3B) is a flow diagram illustrating one example of a pairing operation between an accessory device and a host device. In this example, the host device 300 may establish trust with an accessory device 302 using a global key known to both the host device 300 and the accessory device 302. The derivation of various keys in the pairing operation of FIG. 3, as well as in the various operations described herein with reference to FIGS. 4 and 5, below, may be carried out by any of a plurality of conventional algorithms. By way of example and not limitation, the various keys described herein may be derived, and messages may be encrypted according to the multimedia internet keying (MIKEY) algorithm using a global key as a pre-shared key (PSK) to establish trust.

According to one feature, pairing takes place only one time after the host device 300 connects to the accessory device 302 for deriving a secret device key shared between the host device 300 and the accessory device 302. A user may trigger 304 a pairing operation at the host device 300. Pairing may be triggered when the host device 300 connects to the accessory device 302 for the first time. In one aspect, the trigger may occur by simply opening a software application executed by the host device 300. In another aspect, the trigger may include a user selecting a menu option in the application to initiate pairing the host device 300 to the accessory device 302.

In response to the trigger, the host device 300 may generate a random sequence number (N) 306. The sequence number may be employed for protecting key management messages against replay attacks. A packet is "replayed" when it is stored by an adversary (e.g., an unauthorized device), and then re-injected by the adversary into the network. Key management messages may be protected against such attaches using sequence numbers. In particular, the sending device may assign sequence numbers to outgoing messages in an increasing order. The sequence number for outgoing messages (Nsnd) may be initialized to the same random value at both the host device 300 and the accessory device 302. The receiving device remembers the value of the highest sequence number that it has seen (Nrcv) along with sequence numbers of authenticated messages in a given window (e.g., between Nrcv−WINDOW_SIZE+1 and Nrcv). Only packets with sequence numbers ahead of the window, or, inside the window but not already received, may be accepted. Such a scheme may be implemented using a bitmap to represent which packets have been received.

The host device 300 then sends a pair request message 308 to the accessory device 302. The pair request message may include the random sequence number (N) generated by the host device 300, an identifier of the host device (host_id), an identifier of the type of host device, and its software version. In some implementations, the host device identifier may comprise a value unique to the host device 300, such as its subscriber number. The type of host device and software version may include identifying the make and/or model of the host device 300. For example, the host device 300 may identify it is an iPhone® operating with a particular firmware version.

Upon receipt of the pair request message, the accessory device 302 may use the device type and software version to retrieve an associated global key (or key_global) 310. According to one feature, a different global key (key_global) is associated with each different device type (e.g., make and/or model of the host device 300). That is, each device type (make and/or model of host devices) is assigned a global key (key_global) unique to its particular device type. In at least one aspect, the accessory device 302 may include an application (e.g., software program) with information embedded inside the application identifying each acceptable device type and the unique global key associated with each device type. In such implementations, the accessory device 302 may look up in the embedded information the global key associated with the host device type.

The accessory device 302 may also generate a random number (or RAND) and a key generator value (or key_gen) 312. The accessory device 302 may employ the random number (RAND) and the global key (key_global) to derive an encryption key (or key_encr), a salt value (or key_salt), and an authentication key (or key_auth) 314, at least some of which may be used to encrypt the key generator value to be sent from the accessory device 302 to the host device 300. After deriving the various keys, the accessory device 302 may increment the sequence number (N) for the accessory device send packets (or $N_{AD\_send}$) 316.

The accessory device 302 may then send a key pairing message 318 to the host device 300. The key pairing message may include the incremented sequence number ($N_{AD\_send}$), the random number (RAND), an identifier of the accessory device (or AD_id), the key generator value (key_gen) encrypted using the encryption key (i.e., E{key_enc} {key_gen}), and a keyed-hash message authentication code (HMAC) over the entire message using the authentication key (key_auth) (i.e., HMAC{key_auth} {message}).

Upon receipt of the key pairing message, the host device 300 guards against a replay attack by validating that the sequence number ($N_{AD\_send}$) is not a replay 320. If the sequence number ($N_{AD\_send}$) is a replay, the host device 300 may ignore the message. If the sequence number ($N_{AD\_send}$) is not a replay, the host device 300 may process the message to derive the authentication key. That is, the host device 300 may use the random number (RAND) received from the accessory device 302 together with the global key (key_global) to derive the same authentication key (key_auth) derived by the accessory device 322.

According to one feature, the global key (key_global) is already found at the host device 300, and is not communicated by the accessory device 302. For example, the host device 300 may be adapted to execute an application, such as a software program, having the global key (key_global) for its particular device type embedded inside the application. In one aspect, the global key (key_global) may be placed inside the application at the factory, i.e. the global key (key_global) may be inside the application, inside the host device 300. In another aspect, the global key (key_global) may be embedded inside the application and the user may download the application from a website. The global key (key_global) at the host device 300 is the same for all host devices of the same type, and is the same as the global key (key_global) associated with that device type at the accessory device 302. Accordingly, the global key (key_global) for the particular type of host device 300 is known to both the host device 300 and the accessory device 302 without any transmission of the global key (key_global) between each other and without transmission from any other external device.

With the authentication key (key_auth), the host device 300 can validate the received keyed-hash message authentication code (HMAC) 324. Upon validation of the HMAC, the host device 300 may employ the random number (RAND) and the global key (key_global) to derive the encryption key (key_encr) and the salt value (key_salt) 326. The host device 300 may then use the encryption key (key_encr) to decrypt the key generator value (key_gen) from the key pairing message 328. Using the key generator value (key_gen) and the random number (RAND), the host device 300 may derive a unique device key (or key_device) 330.

The host device 300 may then increment the sequence number (N) for the host device send packets (or $N_H\_send$) 332 and may send a key verification message 334 to the accessory device 302. The key verification message may include the incremented sequence number ($N_H\_send$), the host device identifier (host_id), the accessory device identifier (AD_id), and a keyed-hash message authentication code (HMAC) over the entire message using the authentication key (key_auth) (i.e., HMAC{key_auth} {message}).

On receipt of the key verification message, the accessory device 302 validates the sequence number ($N_H\_send$) and the HMAC 336. If valid, the accessory device 302 may generate the device key (key_device) from the key generator value (key_gen) and the random number (RAND) 338. The device key (key_device), together with the identification of the host device 300 (host_id) and an expiration date of the device key (or key_device_lifetime) may be stored in a storage medium 340.

The accessory device 302 may again increment the sequence number for the accessory device send packets (or $N_{AD}\_send$) 342 and may transmit to the host device 300 a key verification message 344. The key verification message may include the incremented sequence number ($N_{AD}\_send$), the host device identifier (host_id), the accessory device identifier (AD_id), and a keyed-hash message authentication code (HMAC) using the authentication key (key_auth) over the entire message (HMAC{key_auth} {message}).

The host device 300 may receive the key verification message from the accessory device 302 and may validate the sequence number ($N_{AD}\_send$) and the HMAC 346. Upon validation, the host device 300 may remove the global key (key_global) to limit its exposure to being compromised by a third party 348. In general, the host device 300 may be more vulnerable to attacks relative to the accessory device 302, which is a more closed platform. Removing the global key (key_global) from the accessory device 302 may not be desirable, since it would prevent the accessory device 302 from pairing with other host devices. The host device 300 may further store the device key (key_device) in a storage medium 350 and may again increment the sequence number for the host device send packets (or $N_H\_send$) 352.

Employing the preceding process, or modifications thereof, both the host device 300 and the accessory device 302 may use a common global key (key_global) to derive a shared secret (e.g., device key (key_device)), which may be employed to establish a secure communication link for conveying forward link only content.

Exemplary Session Establishment Operation

Figure 4A:
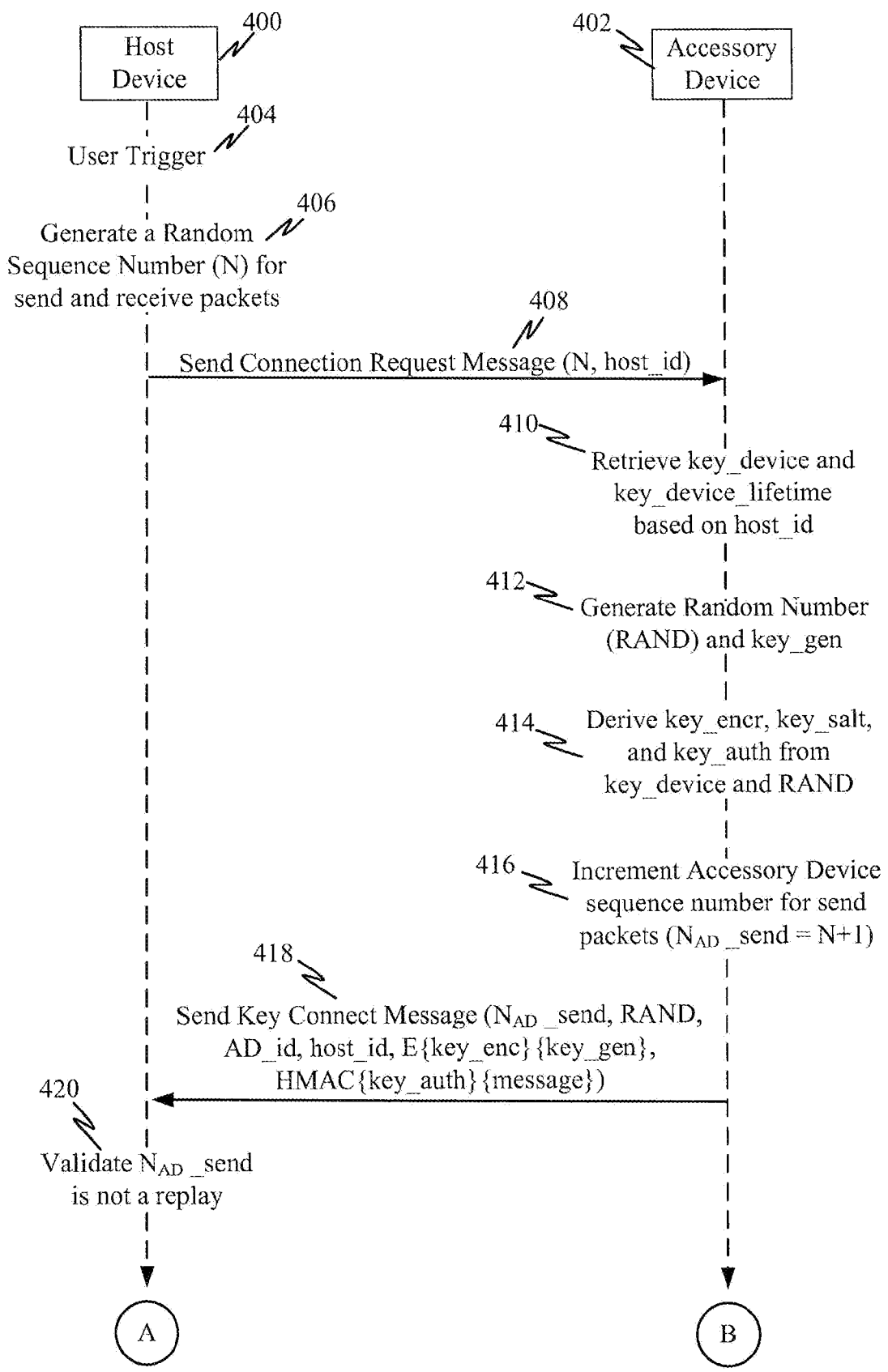
FIG. 4 (comprising FIGS. 4A and 4B) is a flow diagram illustrating one example of establishing a secure communication link between an accessory device and a host device.
Figure 4B:
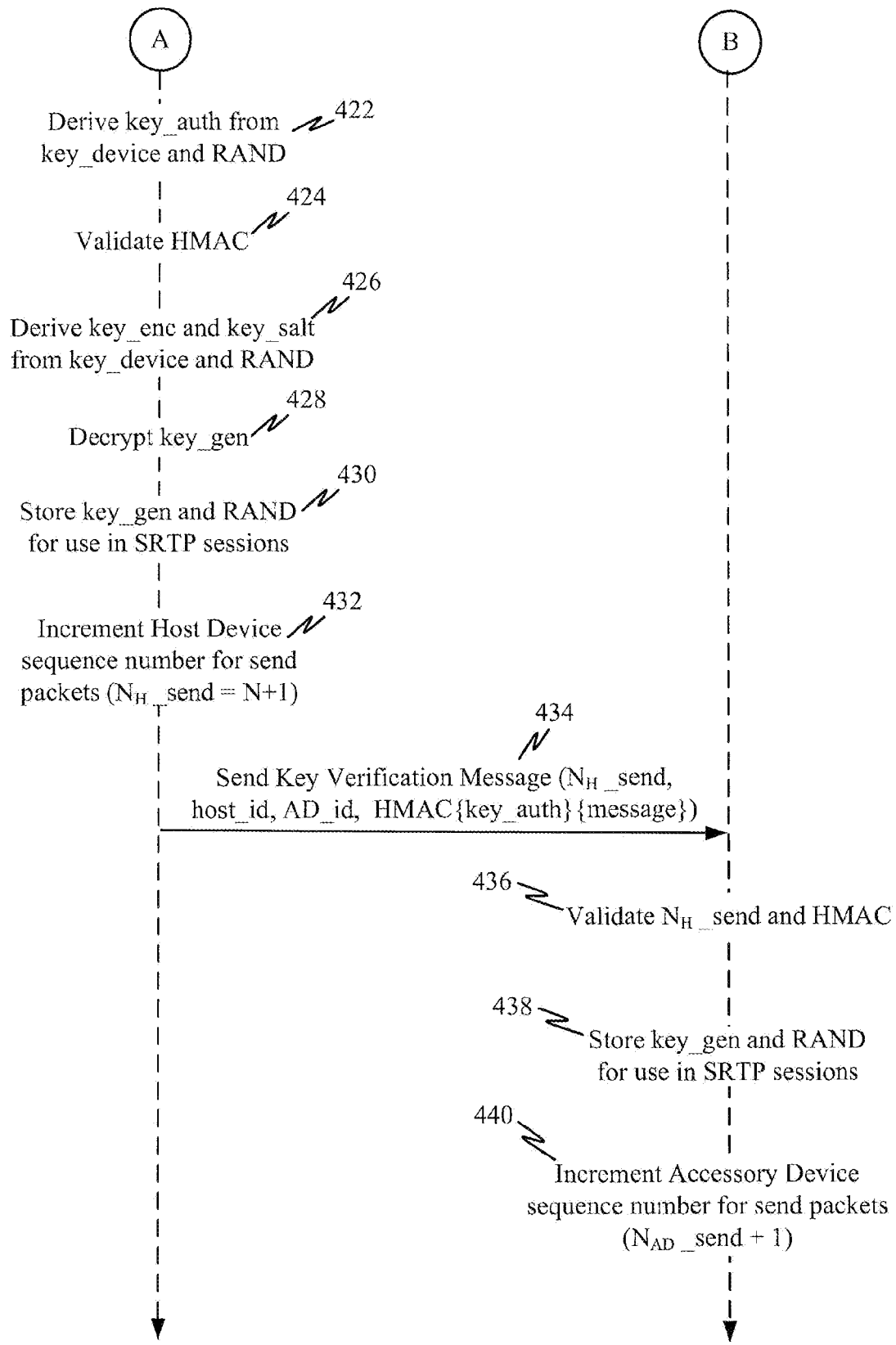

FIG. 4 (comprising FIGS. 4A and 4B) is a flow diagram illustrating one example of establishing a secure communication link between an accessory device and a host device. According to one feature, the session establishment operation may perform mutual authentication between the host device 400 and the accessory device 402, initialize sequence numbers and establish a key generator value (key_gen). The following example shows how the device key (key_device), derived using a key generator value (key_gen) communicated as a value encrypted using the global key (key_global) in the pairing operation, may be used to establish a session between the host device and the accessory device. That is, the global key (key_global) becomes the root of trust for establishing a device key and any subsequent keys that ultimately results in the ability of the host device and the accessory device to establish a secured communication session.

Initially, a user may trigger 404 a session establishment operation at the host device 400. Session establishment may be triggered when a software application is initiated on the host device 400. In response to the trigger, the host device 400 may generate a random sequence number (N) for use in send and receive packets 406. The host device 400 then sends to the accessory device 402 a connection request message 408. The pair request message may include the random sequence number (N) generated by the host device 400 and the identifier of the host device (host_id).

The accessory device 402 may use the identifier of the host device (host_id) to retrieve the stored device key (key_device generated by the pairing operation or a re-keying operation) associated with the particular host device 400, and the expiration date of the device key (key_device_lifetime). If the device key (key_device) is not expired, the accessory device 402 may generate a random number (RAND) and a key generator value (key_gen) 412. It is noteworthy that the random number (RAND) and the key generator value (key_gen) of the session establishment operation of FIG. 4 are not the same random number and key generator value that were generated in the pairing operation of FIG. 2. They are new values generated specifically for the particular session.

Using the device key (key_device) and the random number (RAND), the accessory device 402 may derive an encryption key (key_encr), a salt value (key_salt) and an authentication key (key_auth). Because the host device 400 and accessory device 402 have been previously paired, both the host device 400 and the accessory device 402 have a respective stored copy of the device key (key_device), without the need to transmit the device key between the two devices. After deriving the various keys, the accessory device 402 may increment the sequence number (N) for the accessory device send packets (or $N_{AD}\_send$) 416 and may send a key connect message 418 to the host device 400. The key connect message may include the incremented sequence number ($N_{AD}\_send$), the random number (RAND), an identifier of the accessory device (or AD_id), the identifier of the host device (host_id, the key generator value (key_gen) encrypted using the encryption key (i.e., E{key_enc} {key_gen}), and a keyed-hash message authentication code (HMAC) over the entire message using the authentication key (key_auth) (i.e., HMAC {key_auth} {message}).

On receipt of the key connect message, the host device 400 guards against a replay attack by validating that the sequence number ($N_{AD}\_send$) is not a replay 420. If the sequence number ($N_{AD}\_send$) is a replay, the host device 400 may ignore the message. If the sequence number ($N_{AD}\_send$) is not a replay, the host device 400 may process the message to derive the authentication key. That is, the host device 400 may use the random number (RAND) received from the accessory device 402 together with the device key (key_device) to derive 422 the same authentication key (key_auth) derived by the accessory device 402.

With the authentication key (key_auth), the host device 400 can validate the key hashed authentication code (HMAC) received with the key pairing message 424. Upon validation of the HMAC, the host device 400 may employ the random number (RAND) and the device key (key_device) to derive the current encryption key (key_encr) and the current salt value (key_salt) 426. The host device 400 may then use the encryption key (key_encr) to decrypt the new key generator value (key_gen) from the key pairing message 428 and may store the key generator value (key_gen) and the random number (RAND) in a storage medium for use in SRTP sessions 430.

The host device 400 may then increment the sequence number (N) for the host device send packets ($N_{H\_}$send) 432 and may send a key verification message 434 to the accessory device 402. The key verification message may include the incremented sequence number ($N_{H\_}$send), the host device identifier (host_id), the accessory device identifier (AD_id), and a keyed-hash message authentication code (HMAC) over the entire message using the authentication key (key_auth) (i.e., HMAC{key_auth} {message}).

On receipt of the key verification message, the accessory device 402 validates the sequence number ($N_{H\_}$send) and the HMAC 436. If valid, the accessory device 402 may store the key generator value (key_gen) and the random number (RAND) in a storage medium 438 for use in SRTP sessions. The accessory device 402 may again increment the sequence number for the accessory device send packets (or $N_{AD\_}$send) 440.

The session establishment operation described above may result in mutual authentication between the host device 400 and the accessory device 402, initialization of sequence numbers, and establishment of a key generator value (key_gen). The key generator value may be used by the host device 400 and the accessory device 402 to derive a master key (or key_master) and a master salt value (or salt_master) for use in secure real-time transport protocol (SRTP) sessions. In at least one implementation, the key generator value (key_gen) and the random number (RAND) from the session establishment operation may be utilized to derive the master key (key_master) and the master salt value (salt_master), which master key material (key_master, salt_master) is employed in a key derivation operation (e.g., SRTP key derivation operation 216 of FIG. 2) to derive a session encryption key (skey_enc) and a session salt value (skey_salt).

Typically, the session establishment operation is carried out before content may be streamed between the host device 400 and the accessory device 402. In order to preserve the security of the SRTP sessions, the master key (key_master) and master salt value (salt_master) passed to the SRTP may be different for each session. Furthermore, new keys may also be used after each channel change.

Exemplary Re-Keying Operation

According to one feature, the device key (key_device) may be changed periodically. Changing the device key (key_device) periodically may protect against cloning attacks where two or more devices use the same key. Cloning attacks may make it possible for multiple devices to share the same pairing slot, effectively bypassing any pairing restrictions. Changing the device key (or re-keying) also provides some level of "forward security", making it difficult to decrypt previously captured sessions using a device key (key_device) that may be exposed by attacks that may be developed in the future.

Figure 5A:
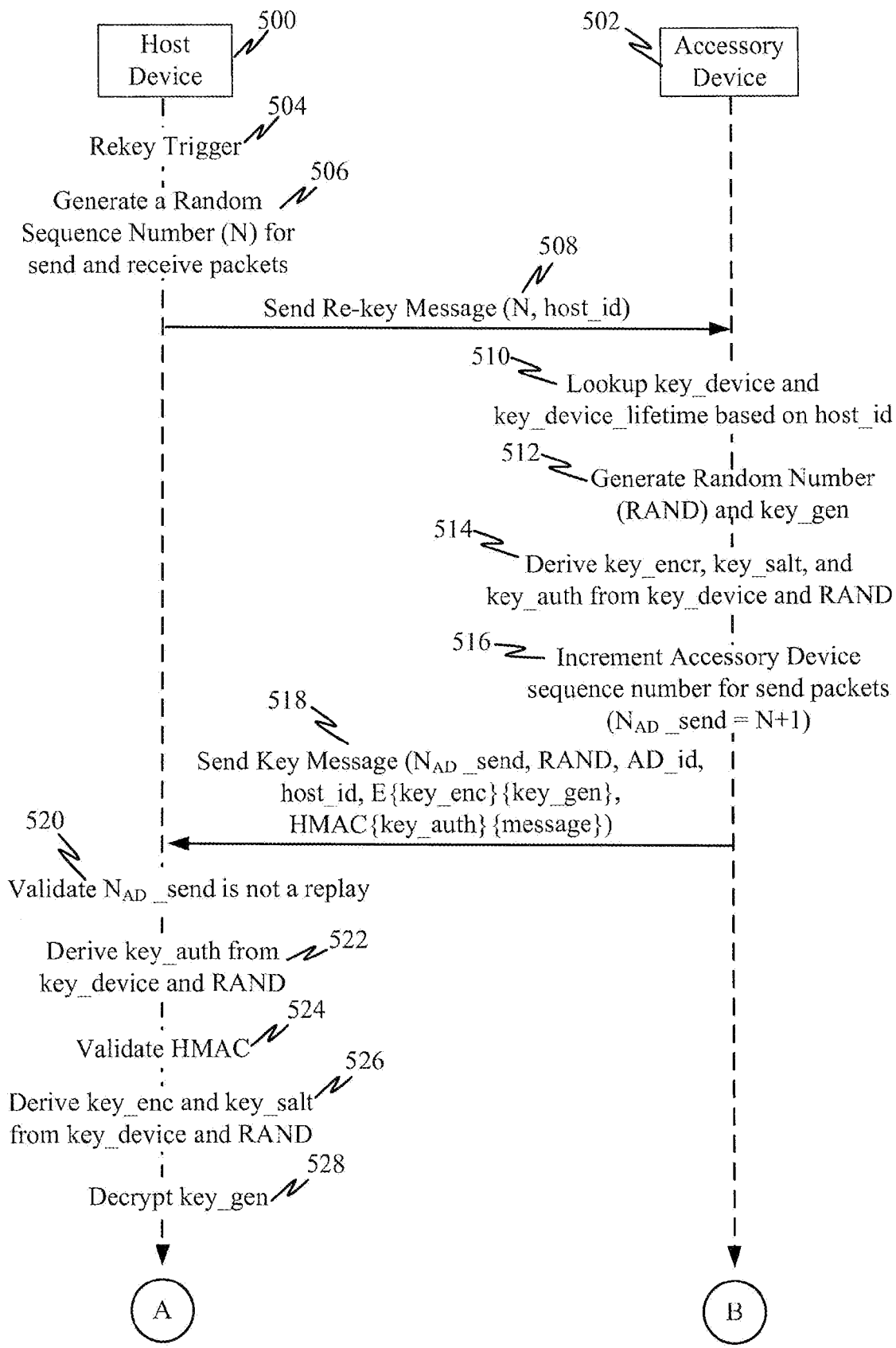
FIG. 5 (comprising FIGS. 5A and 5B) is a flow diagram illustrating one example of establishing a new device key shared between an accessory device and a host device.
Figure 5B:
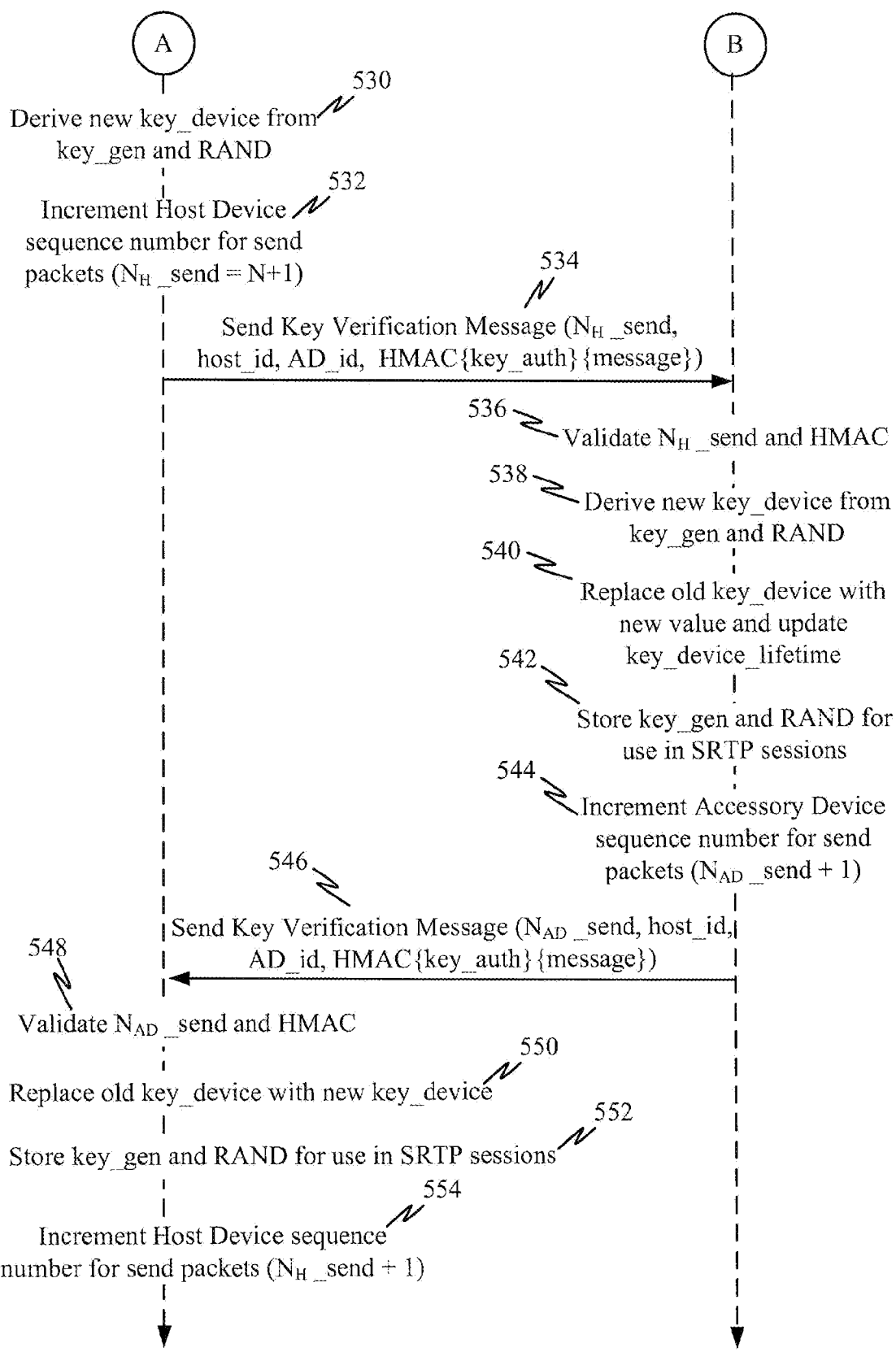

FIG. 5 (comprising FIGS. 5A and 5B) is a flow diagram illustrating one example of establishing a new device key shared between an accessory device and a host device. In this example, the host device 500 may establish a new device key (key_device) with the accessory device 502. In particular, the host device 500 and the accessory device 502 employ the current (or expired) device key (key_device) to encrypt a key generator value (key_gen) communicated to the host device and employed to derive a new device key (key_device). Because the derivation of the new device key (key_device) relies on a key generator value encrypted using the expired device key and communicated to the host device 500, re-keying is dependent on expired device key, which, as described with reference to FIG. 4 above, ultimately is dependent on the global key used in generating the first device key. Accordingly, it should be apparent that all key management ultimately is reliant on the global key associated with the particular types of host devices.

Initially, the re-keying operation may be initiated by some trigger 504. For example, the re-keying operation may be triggered when the accessory device 502 detects that the device key (key_device) is expired or may expire in less than a configurable time limit. That is, when the accessory device 502 receives a connection request message (see FIG. 4), it may determine that the device key expiration date (key_device_lifetime) has passed. In such a case, the accessory device 502 may return an "expired" error code message to the host device 500, instead of a key pairing message (see FIG. 4). As a result, the host device 500 may generate a new random sequence number (N) 506 and may send a re-key request message 508 to the accessory device 502. The re-key request message may include the random sequence number (N) and the identifier of the host device (host_id).

Upon receipt of the re-key request message, the accessory device 502 may use the identifier of the host device (host_id) to lookup the associated device key (key_device) and device key expiration date (key_device_lifetime) 510. The accessory device 502 may also generate a random number (RAND) and a key generator value (key_gen) 512. Similar to the operation described with reference to FIG. 4, the random number (RAND) and key generator value (key_gen) of the re-keying operation of FIG. 5 are not the same random number and key generator value that were generated in the pairing operation or the session establishment operations described above. They are new values generated specifically for the present operation.

The accessory device 502 may employ the random number and the current (expired) device key (key_device) to derive a new encryption key (key_encr), salt value (key_salt), and authentication key (key_auth) 514. After deriving the various keys, the accessory device 302 may increment the sequence number (N) for the accessory device send packets (or $N_{AD\_}$send) 516 and may send a key message 518 to the host device 500. The key message may include the incremented sequence number ($N_{AD\_}$send), the random number (RAND), an identifier of the accessory device (or AD_id), the identifier of the host device (host_id), the key generator value (key_gen) encrypted using the encryption key (i.e., E{key_enc} {key_gen}), and a keyed-hash message authentication code (HMAC) over the entire message (i.e., HMAC{key_auth} {message}).

Upon receipt of the key pairing message, the host device 500 guards against a replay attack by validating that the sequence number ($N_{AD\_}$send) is not a replay 520. If the sequence number ($N_{AD\_}$send) is not a replay, the host device 500 may process the message to derive the authentication key (key_auth). That is, the host device 500 may use the random number (RAND) received from the accessory device 502 together with the current (expired) device key (key_device) to derive the same authentication key (key_auth) derived by the accessory device 522.

With the authentication key (key_auth), the host device 500 can validate the received keyed-hash message authentication code (HMAC) 524. Upon validation of the HMAC, the host device 500 may employ the random number (RAND) and the expired device key (key_device) to derive the encryption key (key_encr) and the salt value (key_salt) 526. The host device 500 may then use the encryption key (key_encr) to decrypt the key generator value (key_gen) from the key pairing message 528. Using the key generator value (key_gen) and the random number (RAND), the host device 500 may derive a new device key (key_device) 530.

The host device 500 may then increment the sequence number (N) for the host device send packets (or $N_{H\_}send$) 532 and may send a key verification message 534 to the accessory device 502. The key verification message may include the incremented sequence number ($N_{H\_}send$), the host device identifier (host_id), the accessory device identifier (AD_id), and a keyed-hash message authentication code (HMAC) over the entire message (HMAC{key_auth} {message}).

On receipt of the key verification message, the accessory device 502 validates the sequence number ($N_{H\_}send$) and the HMAC 536. If valid, the accessory device 502 may generate the new device key (key_device) using the key generator value (key_gen) and the random number (RAND) 538. The accessory device 502 may replace the old device key with the new value and may update the expiration date for the new device key (key_device_lifetime) in the storage medium 540. The accessory device 502 may also store the key generator value (key_gen) and the random number (RAND) for use in secured real-time transport protocol (SRTP) sessions 542.

The accessory device 502 may again increment the sequence number for the accessory device send packets (or $N_{AD\_}end$) 544 and may transmit to the host device 500 a key verification message 344. The key verification message may include the incremented sequence number ($N_{AD\_}send$), the host device identifier (host_id), the accessory device identifier (AD_id), and a keyed-hash message authentication code (HMAC) over the entire message (i.e., HMAC{key_auth} {message}).

The host device 500 may receive the key verification message from the accessory device 502 and may validate the sequence number ($N_{AD\_}send$) and the HMAC 548. Upon validation, the host device 500 may replace the old device key with the new device key 550, and may also store the key generator value (key_gen) and the random number (RAND) in a storage medium 552. Furthermore, the host device 500 may again increment the sequence number for the host device send packets (or $N_{H\_}send$) 554.

Exemplary Accessory Device

Figure 6:
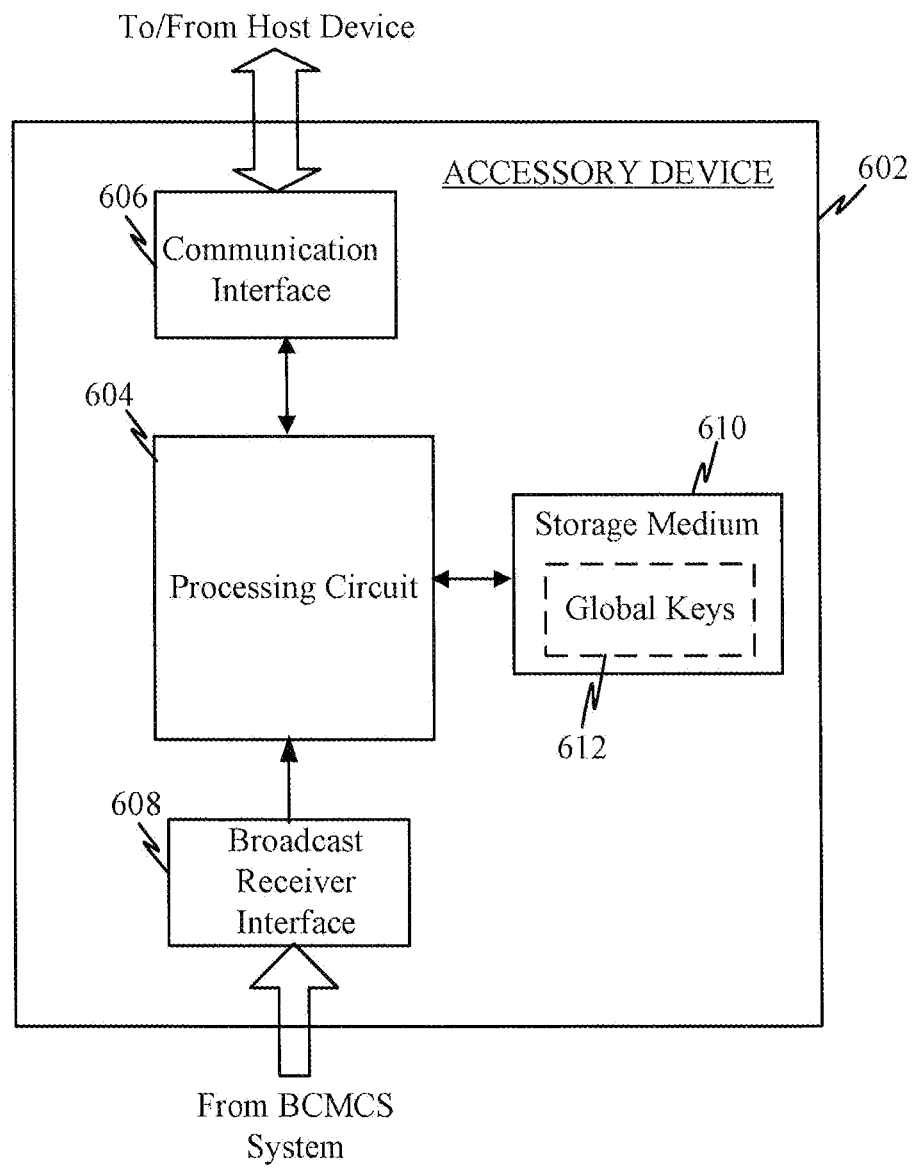
FIG. 6 is a block diagram illustrating an example of an accessory device configured to establish trust with a host device.

FIG. 6 is a block diagram illustrating an example of an accessory device configured to establish trust with a host device. The accessory device 602 may include a processing circuit 604 coupled to a communication interface 606, a broadcast receiver interface 608 (or first communication interface), and/or a storage medium 610. The processing circuit 604 may be adapted to perform at least some of the functions and operations for the accessory devices described herein above with relation to FIGS. 2-5. The accessory device 602 may receive content, keys and other information. The accessory device 602 may also be provisioned with other information for a broadcast/multicast services (BCMCS) system (e.g., via a forward link only network). The storage medium 610 may include all the global keys 612 and their associated device types. For example, the storage medium 610 may include an application having an embedded table listing all the device types and their corresponding global keys. The processing circuit 604 may be adapted to look up a global key in the table for any device type. In some embodiments, the table may be updated and/or revised by communications received via the broadcast receiver interface 608. The communication interface 606, which may also be characterized herein as a second communication interface, may be a wired or wireless communication interface through which the accessory device 602 may communicate with one or more host devices. In at least some implementations, the accessory device may comprise a forward link only receiver.

Figure 7:
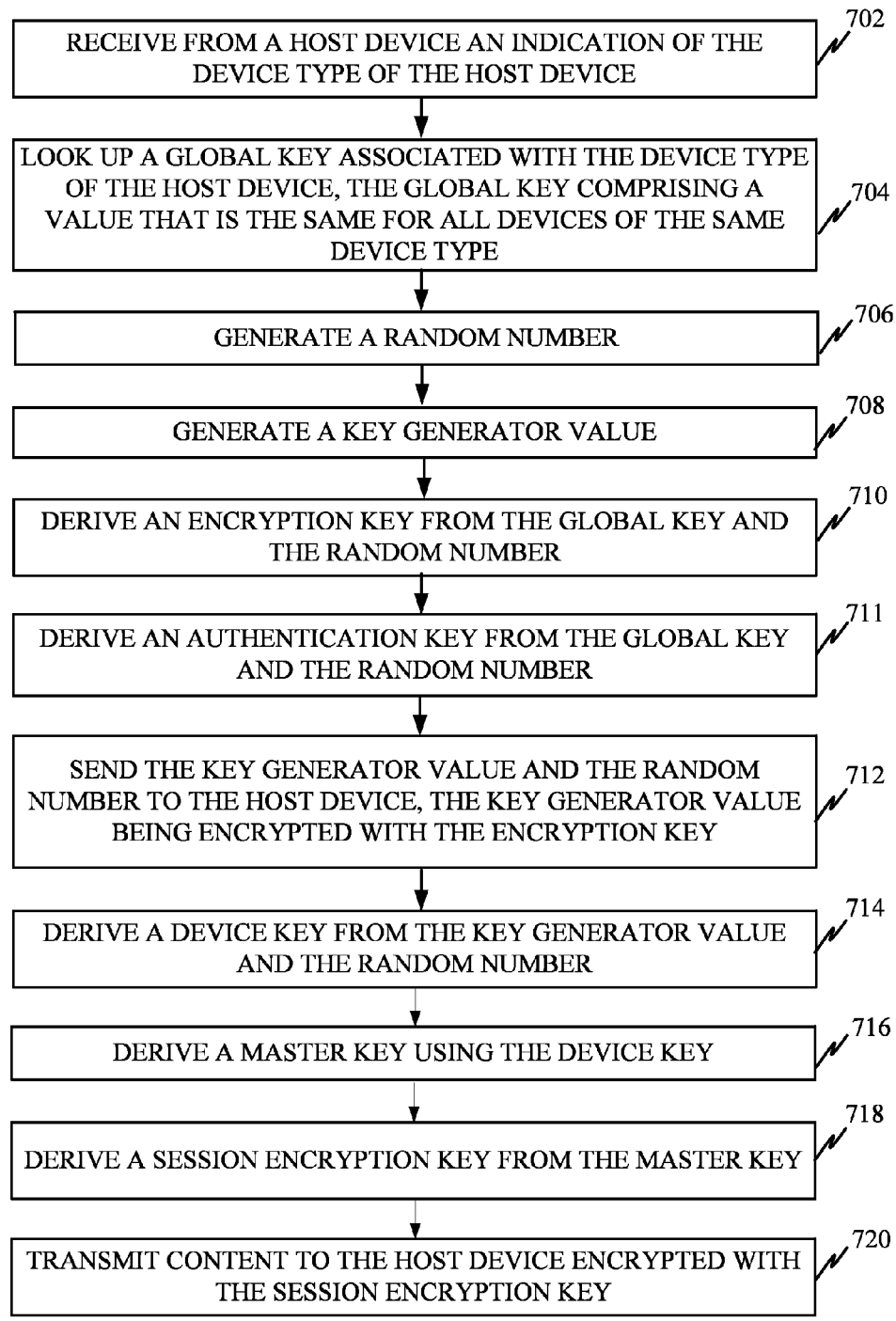
FIG. 7 illustrates a flow chart of a method, operational on an accessory device, of one example of establishing trust between the accessory device and a host device.

FIG. 7 illustrates a flow chart of a method, operational on an accessory device, of one example of establishing trust between the accessory device and a host device. Initially, the accessory device may receive a message from the host device including an indication of the device type of the host device 702. The accessory device may utilize the device type of the host device to look up a global key associated with the device type of the host device 704. As described above, the global key comprises a value unique to all devices of the same device type. The accessory device may generate a random number 706 and a key generator value 708. An encryption key may then be derived from the global key and the random number 710. In addition, a symmetric authentication key may be derived from the global key and the random number to mutually authenticate all messages exchanged with the host device within the same operation 711. A message may be sent to the host device including the key generator value encrypted with the encryption key and the random number 712. A device key may be derived from the key generator value and the random number 714.

The accessory device may use the device key to derive a master key 716. In at least one implementation, deriving the master key from the device key may be initiated by receiving a connection request message from the host device. The accessory device may then generate a new random number, and may derive a new encryption key from the new random number and the device key. In addition, the accessory device may generate a new key generator value, and may derive the master key from the new key generator value.

With the master key, the accessory device may derive a session encryption key from the master key 718. The session encryption key between the accessory device and the host device may be temporary. Finally, the accessory device may transmit content to the host device that is encrypted with the session encryption key 720. Such content may comprise real-time content.

Exemplary Host Device

Figure 8:
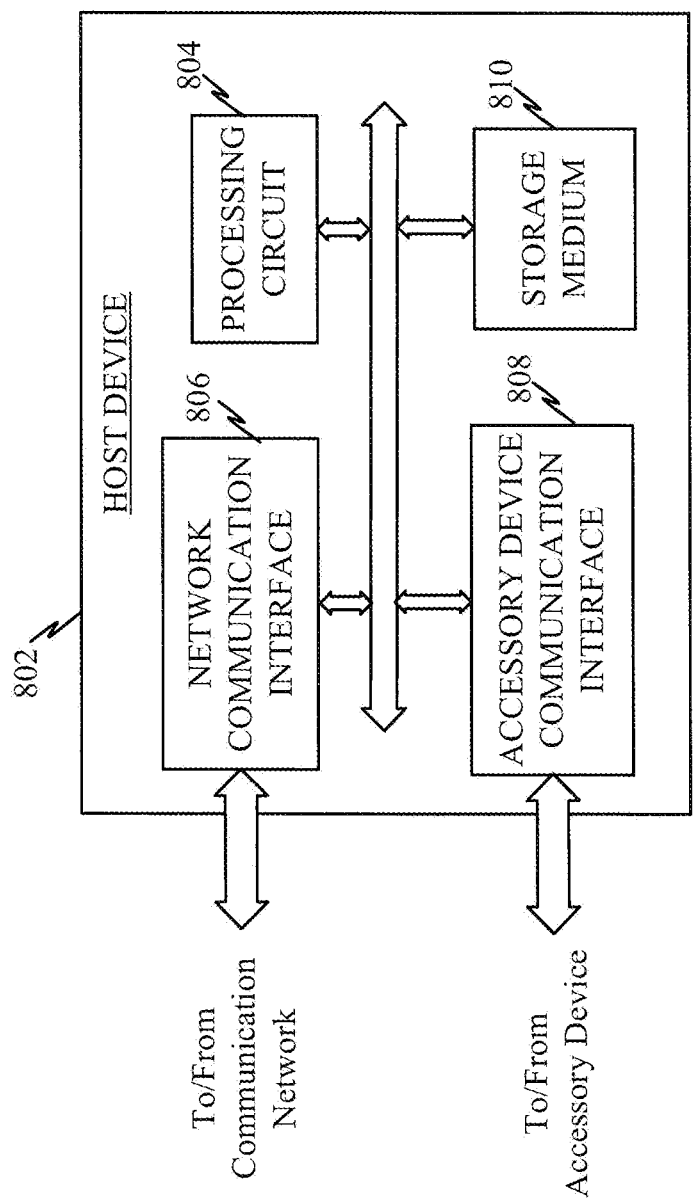
FIG. 8 illustrates a block diagram illustrating an example of a host device configured to establish trust with an accessory device.

FIG. 8 illustrates is a block diagram illustrating an example of a host device configured to establish trust with an accessory device. The host device 802 may include a processing circuit (e.g., processor, processing module, etc.) 804 coupled to a network communication interface 806, an accessory device communication interface 808 for communicating with an accessory device and/or a storage medium 810 to store content, keys and other information received. In at least some implementations, the processing circuit 804 may be adapted to perform at least some of the functions and operations for the host devices described herein above with relation to FIGS. 2-5. The storage medium 810 may store a global key unique to the particular device type of the host device 802, which global key may be used in a pairing operation to pair the host device 802 to an accessory device, as described herein. The accessory device communication interface 808 may be a wired or wireless communication interface through which the host device 802 may communicate with an accessory device.

Figure 9:
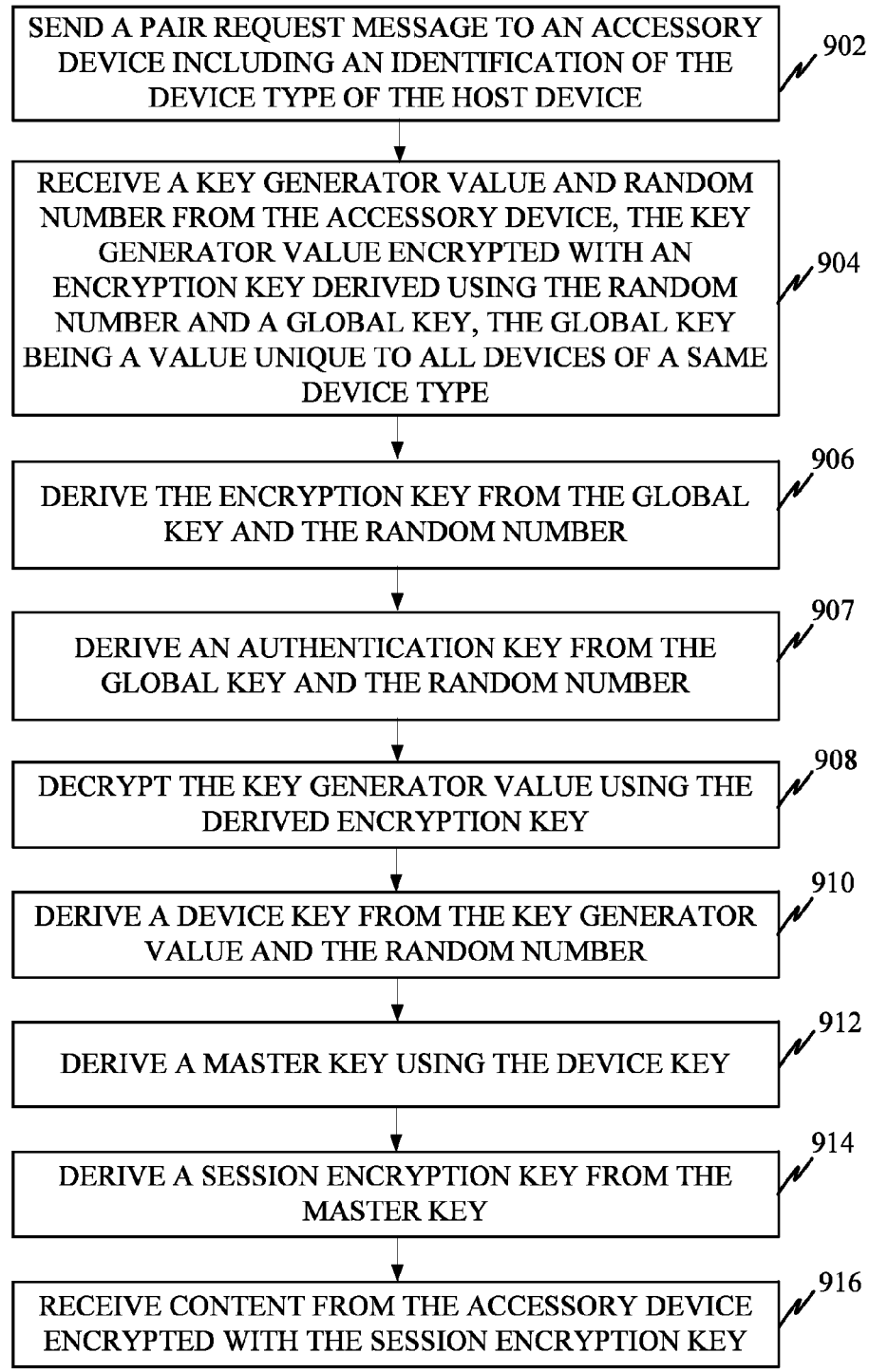
FIG. 9 illustrates a flow chart of one example of a method, operational on a host device, for establishing trust between an accessory device and the host device.

FIG. 9 illustrates a flow chart of one example of a method, operational on a host device, for establishing trust between an accessory device and the host device. Initially, the host device may send a pair request message to an accessory device 902. The pair request message may include an identification of the device type of the host device. The host device may then receive a key generator value and a random number from the accessory device 904. The key generator value may be encrypted with an encryption key derived using the random number and a global key. As noted herein above, the global key comprises a value that is unique to a particular device type. That is, the global value is the same for all devices of the same device type, although the global value differs among different device types.

The host device may derive the encryption key from the global key and the random number 906. In addition, a symmetric authentication key may be derived from the global key and the random number to mutually authenticate all messages exchanged with the accessory device within the same operation 907. The host device may use the derived encryption key to decrypt the key generator value 908. With the key generator value, the host device may derive a device key from the key generator value and the random number 910.

The host device may use the device key to derive a master key 912. In at least one implementation, deriving the master key from the device key may be initiated by sending a connection request message to the accessory device. The host device may then receive a new random number from the accessory device, and may derive a new encryption key from the new random number and the device key. In addition, the host device may receive a new key generator value from the accessory device, and may derive the master key from the new key generator value.

With the master key, the host device may derive a session encryption key from the master key 914. The session encryption key between the accessory device and the host device may be a temporary key that is replaced for each session. Finally, the host device may receive content from the accessory device that is encrypted with the session encryption key 916. Such content may comprise real-time content.

One or more of the components, steps, and/or functions illustrated in FIGS. 1, 2, 3, 4, 5, 6, 7 and/or 8 may be rearranged and/or combined into a single component, step, or function or embodied in several components, steps, or functions. Additional elements, components, steps, and/or functions may also be added without departing from the invention. The apparatus, devices, and/or components illustrated in FIGS. 1, 6, and/or 8 may be configured to perform one or more of the methods, features, or steps described in FIGS. 2, 3, 4, 5, 7, and/or 9. The novel algorithms described herein may be efficiently implemented in software and/or embedded hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a non-transitory machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components. e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of non-transitory storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on a host device for establishing trust with an accessory device, comprising:

sending a pairing request message to an accessory device, the pair request message comprising an identification of a device type of the host device;

receiving a key generator value and a random number from the accessory device, the key generator value being encrypted using a derived key based on the random number and a global key, wherein the global key comprises a value known to the host device and is the same for all devices of a same device type;

obtaining the derived key from the global key and the random number;

decrypting the key generator value using the derived key; and deriving a device key from the key generator value and the random number, wherein the device key is employed for establishing secure delivery of content from the accessory device.

2. The method of claim 1, further comprising:
deriving an authentication key from the global key and the random number;
authenticating messages received from the accessory device using the authentication key; and
signing messages sent to the accessory device using the authentication key.

3. The method of claim 1, further comprising:
deriving a master key using the device key;
obtaining a session derived key from the master key; and
receiving content from the accessory device encrypted with the session derived key.

4. The method of claim 3, wherein deriving the master key using the device key comprises:
sending a connection request message to the accessory device;
receiving a new key generator value and a new random number from the accessory device, wherein the new key generator value is encrypted using a new derived key based on the device key and the new random number;
obtaining the new derived key using the device key and the new random number;
decrypting the new key generator value using the new derived key; and
deriving the master key from the new key generator value.

5. The method of claim 4, wherein deriving the master key using the device key further comprises:
deriving a new authentication key from the device key and the new random number;
authenticating messages received from the accessory device using the new authentication key; and
signing messages sent to the accessory device using the new authentication key.

6. The method of claim 3, wherein the session derived key between the accessory device and the host device is employed only for a single session of receiving content from the accessory device.

7. The method of claim 1, wherein the content is real-time multimedia streams.

8. The method of claim 1, wherein the accessory device is a forward link only receiver.

9. The method of claim 1, wherein the accessory device is physically coupled to the host device.

10. The method of claim 1, further comprising removing the global key from the host device.

11. The method of claim 1, wherein the global key known to the host device is different from a global key for devices of a different device type.

12. A host device for establishing trust with an accessory device, the host device comprising:
a communication interface for communicating with the accessory device;
a storage medium; and
a processing circuit coupled to the communication interface and the storage medium, the processing circuit adapted to:
send a pair request message to an accessory device, the pair request message comprising an identification of a device type of the host device;
receive a key generator value and a random number from the accessory device, the key generator value being encrypted using a derived key based on the random number and a global key, wherein the global key comprises a value known to the host device that is the same for all devices of a same device type;
obtain the derived key from the global key and the random number,
decrypt the key generator value using the derived key; and
derive a device key from the key generator value and the random number, wherein the device key is employed for establishing secure delivery of content from the accessory device.

13. The host device of claim 12, wherein the processing circuit is further adapted to:
derive an authentication key from the global key and the random number;
authenticate messages received from the accessory device using the authentication key; and
sign messages sent to the accessory device using the authentication key.

14. The host device of claim 12, wherein the processing circuit is further adapted to:
derive a master key using the device key;
obtain a session derived key from the master key; and
receive content from the accessory device encrypted with the session derived key.

15. The host device of claim 14, wherein the processing circuit being adapted to derive the master key using the device key comprises the processing circuit adapted to:
send a connection request message to the accessory device;
receive a new key generator value and a new random number from the accessory device, wherein the new key generator value is encrypted using a new derived key using based on the device key and the new random number;
obtain the new derived key using the device key and the new random number;
decrypt the new key generator value using the new derived key; and
derive the master key from the new key generator value.

16. The host device of claim 14, wherein the session derived key between the accessory device and the host device is employed only for a single session of receiving content from the accessory device.

17. The host device of claim 12, wherein the content is real-time multimedia streams.

18. The host device of claim 12, wherein the accessory device is a forward link only receiver.

19. The host device of claim 12, wherein the accessory device is physically coupled to the host device.

20. The host device of claim 12, wherein the processing circuit is further adapted to remove the global key from the host device.

21. The host device of claim 12, wherein the global key known to the host device is different from a global key for devices of a different device type.

22. A host device for establishing trust with an accessory device, the host device comprising:
means for sending a pair request message to an accessory device, the pair request message comprising an identification of a device type of the host device;
means for receiving a key generator value and a random number from the accessory device, the key generator value being encrypted using a derived key based on the random number and a global key, wherein the global key comprises a value known to the host device that is the same for all devices of a same device type;

means for obtaining the derived key from the global key and the random number;
means for decrypting the key generator value using the derived key; and
means for deriving a device key from the key generator value and the random number, wherein the device key is employed for establishing secure delivery of content from the accessory device.

23. The host device of claim 22, further comprising:
means for deriving an authentication key from the global key and the random number;
means for authenticating messages received from the accessory device using the authentication key; and
means for signing messages sent to the accessory device using the authentication key.

24. A non-transitory machine-readable medium comprising instructions executable by a processor for establishing trust between an accessory device and a host device, which instructions cause the processor to:
send a pair request message to an accessory device, the pair request message comprising an identification of a device type of the host device;
receive a key generator value and a random number from the accessory device, the key generator value being encrypted using a derived key based on the random number and a global key, wherein the global key comprises a value known to the host device that is the same for all devices of a same device type;
obtain the derived key from the global key and the random number;
decrypt the key generator value using the derived key; and
derive a device key from the key generator value and the random number, wherein the device key is employed for establishing secure delivery of content from the accessory device.

25. The non-transitory machine-readable medium of claim 24, wherein the instructions further cause the processor to:
derive an authentication key from the global key and the random number;
authenticate messages received from the accessory device using the authentication key; and
sign messages sent to the accessory device using the authentication key.

26. A method operational on an accessory device for establishing trust with a host device, comprising:
receiving from a host device an indication of a device type of the host device;
looking up a global key associated with the device type of the host device, the global key comprising a value that is the same for all devices of a same device type;
generating a random number;
generating a key generator value;
obtaining a derived key from the global key and the random number;
sending the key generator value and the random number to the host device, the key generator value being encrypted with the derived key; and
deriving a device key from the key generator value and the random number, wherein the device key is employed for establishing secure delivery of content to the host device.

27. The method of claim 26, further comprising:
deriving an authentication key from the global key and the random number;
authenticating messages received from the host device using the authentication key; and
signing messages sent to the host device using the authentication key.

28. The method of claim 26, further comprising:
deriving a master key using the device key;
obtaining a session derived key from the master key; and
transmitting content to the host device encrypted with the session derived key.

29. The method of claim 28, wherein deriving the master key using the device key comprises:
receiving a connection request message from the host device;
generating a new random number and a new key generator value;
obtaining a new derived key from the device key and the new random number;
sending the new key generator value and the new random number to the host device, the new key generator value being encrypted with the new derived key; and
deriving the master key from the new key generator value.

30. The method of claim 29, further comprising:
deriving a new authentication key from the device key and the new random number;
authenticating message received from the host device using the new authentication key; and
signing messages sent to the host device using the new authentication key.

31. The method of claim 28, wherein the session derived key between the accessory device and the host device is employed only for a single session of sending content to the host device.

32. The method of claim 26, wherein the content is real-time multimedia streams.

33. The method of claim 26, wherein the global key associated with the device type of the host device is different from a global key associated with a different device type.

34. An accessory device adapted to establish trust with a host device, the accessory device comprising:
a first communication interface for receiving communications with a subscriber-based service;
a second communication interface for communicating with a host device; and
a processing circuit coupled to the first and second communication interfaces, the processing circuit adapted to:
receive from a host device an indication of a device type of the host device;
look up a global key associated with the device type of the host device, the global key comprising a value that is the same for all devices of a same device type;
generate a random number;
generate a key generator value;
obtain a derived key from the global key and the random number;
send the key generator value and the random number to the host device, the key generator value being encrypted with the derived key; and
derive a device key from the key generator value and the random number, wherein the device key is employed for establishing secure delivery of content to the host device.

35. The accessory device of claim 34, wherein the processing circuit is further adapted to:
derive an authentication key from the global key and the random number;
authenticate messages received from the host device using the authentication key; and
sign messages sent to the host device using the authentication key.

36. The accessory device of claim 34, wherein the processing circuit is further adapted to:
  derive a master key using the device key;
  obtain a session derived key from the master key; and
  transmit content to the host device encrypted with the session derived key.

37. The accessory device of claim 36, wherein the processing circuit adapted to derive the master key using the device key comprises the processing circuit adapted to:
  receive a connection request message from the host device;
  generate a new random number and a new key generator value;
  obtain a new derived key from the device key and the new random number;
  send the new key generator value and the new random number to the host device, the new key generator value being encrypted with the new derived key; and
  derive the master key from the new key generator value.

38. The accessory device of claim 36, wherein the session derived key between the accessory device and the host device is employed only for a single session of sending content to the host device.

39. The accessory device of claim 34, wherein the content is real-time multimedia streams.

40. The accessory device of claim 34, wherein the accessory device is a forward link only receiver.

41. The accessory device of claim 34, wherein the accessory device is physically coupled to the host device.

42. The accessory device of claim 34, wherein the global key associated with the device type of the host device is different from a global key associated with a different device type.

43. An accessory device adapted to establish trust with a host device, the accessory device comprising:
  means for receiving from a host device an indication of a device type of the host device;
  means for looking up a global key associated with the device type of the host device, the global key comprising a value that is the same for all devices of a same device type;
  means for generating a random number;
  means for generating a key generator value;
  means for obtaining a derived key from the global key and the random number;
  means for sending the key generator value and the random number to the host device, the key generator value being encrypted with the derived key; and
  means for deriving a device key from the key generator value and the random number.

44. The accessory device of claim 43, further comprising:
  means for deriving an authentication key from the global key and the random number;
  means for authenticating messages received from the host device using the authentication key; and
  means for signing messages sent to the host device using the authentication key.

45. A non-transitory machine-readable medium comprising instructions executable by a processor for establishing trust between an accessory device and a host device, which instructions cause the processor to:
  receive from a host device an indication of a device type of the host device;
  look up a global key associated with the device type of the host device, the global key comprising a value that is the same for all devices of a same device type;
  generate a random number;
  generate a key generator value;
  obtain a derived key from the global key and the random number;
  send the key generator value and the random number to the host device, the key generator value being encrypted with the derived key; and
  derive a device key from the key generator value and the random number.

46. The non-transitory machine-readable medium of claim 45, further comprising instructions adapted to cause the processor to:
  derive an authentication key from the global key and the random number;
  authenticate messages received from the host device using the authentication key; and
  sign messages sent to the host device using the authentication key.

* * * * *